United States Patent
MacDonald et al.

(10) Patent No.: US 6,999,627 B2
(45) Date of Patent: Feb. 14, 2006

(54) DETERMINISTIC PREDICTION IN AN IMAGE PROCESSING SYSTEM

(75) Inventors: Colin MacDonald, Austin, TX (US); Tamas Kovacs, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 759 days.

(21) Appl. No.: 10/025,290

(22) Filed: Dec. 19, 2001

(65) Prior Publication Data

US 2003/0113023 A1 Jun. 19, 2003

(51) Int. Cl.
*G06K 9/36* (2006.01)

(52) U.S. Cl. ...................................... 382/238
(58) Field of Classification Search ......... 382/232–233, 382/236, 238, 240, 244–248, 250, 251; 348/384.1, 348/394.1, 395.1, 409.1, 411.1, 412.1, 415.1, 348/403.1; 375/240, 240.12, 240.18, 240.2; 315/240.25; 341/50, 106
See application file for complete search history.

(56) References Cited

U.S. PATENT DOCUMENTS

| | | | | |
|---|---|---|---|---|
| 5,655,032 A | * | 8/1997 | Ohsawa et al. | 382/238 |
| 5,881,176 A | * | 3/1999 | Keith et al. | 382/248 |
| 6,091,854 A | * | 7/2000 | Slattery et al. | 382/232 |
| 6,141,446 A | * | 10/2000 | Boliek et al. | 382/233 |
| 6,756,921 B2 | * | 6/2004 | Kimura et al. | 341/50 |
| 6,757,437 B1 | * | 6/2004 | Keith et al. | 382/240 |

OTHER PUBLICATIONS

International Telecommunication Uniot, ITU–T Telecommunication Standardization Sector of ITU, T.82 (Mar. 1993), Terminal Equipment and Protocols for Telematic Services, Information Technology—Coded Representation of Picture and Audio Information—Progressive Bi–Level Image Compression, ITU–T Recommendation T.82 (Previously "CCITT Recommendation", pp. i–100.

* cited by examiner

*Primary Examiner*—Jose L. Couso
(74) *Attorney, Agent, or Firm*—Joanna G. Chiu; Daniel D. Hill

(57) ABSTRACT

Embodiments of the present invention relate to deterministic prediction in an image processing system. One aspect relates to an image processing system having a deterministic prediction decode unit for predicting individual pixels of an image based on a predetermined deterministic prediction algorithm. The deterministic prediction decode unit includes a look-up table, organized into four spatial phases, for storing values to be used by the predetermined deterministic prediction algorithm when converting a relatively low resolution image to a relatively higher resolution image. A prediction is made for a target pixel by accessing at least two of the four spatial phases of the look-up table to read at least two possible values of the target pixel. In one embodiment, the value of two target pixels can be provided within a same clock period, thus allowing for the decoding of two spatial phases with each access to the look-up table.

19 Claims, 3 Drawing Sheets

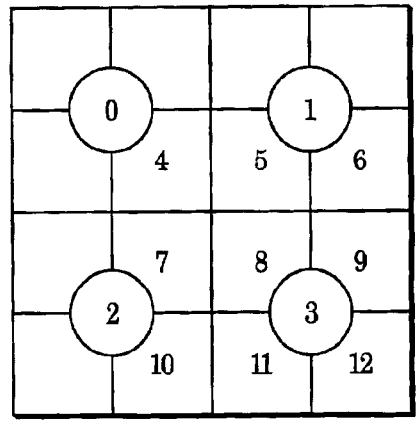
FIG.1
−PRIOR ART−
| PHASE | TARGET PIXEL | REFERENCE PIXELS |
|---|---|---|
| 0 | 8 | 0, 1, 2, 3, 4, 5, 6, 7, |
| 1 | 9 | 0, 1, 2, 3, 4, 5, 6, 7, 8 |
| 2 | 11 | 0, 1, 2, 3, 4, 5, 6, 7, 8, 9, 10 |
| 3 | 12 | 0, 1, 2, 3, 4, 5, 6, 7, 8, 9, 10, 11 |
FIG.2
−PRIOR ART−
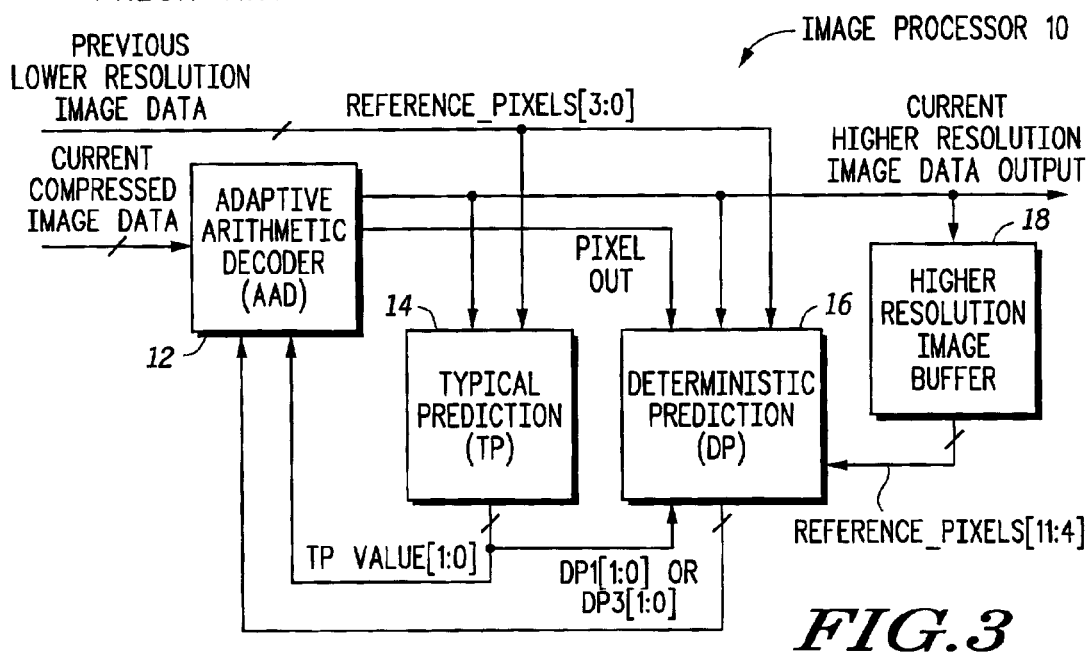
FIG.3

US 6,999,627 B2

DETERMINISTIC PREDICTION IN AN IMAGE PROCESSING SYSTEM

FIELD OF THE INVENTION

The present invention relates to image processing, and more specifically, to performing deterministic prediction in an image processing system.

RELATED ART

Image processing denotes the performance of various functions on an image or set of images, such as compression, encryption, encoding, decoding, searching or feature recognition, image or color enhancement, resolution or size reduction, etc. One challenge for image processing hardware is to maintain performance at reasonable or reduced cost.

Various algorithms are known for image processing depending upon the particular technology. For facsimile or printer technologies, for example, image compression is desirable to reduce image data for purposes of transmission or storage. Some algorithms, such as raster image processing, involve processing a pixel or a group of pixels based upon one or more neighboring pixels, otherwise referred to as "context" for the pixel. One example of a known algorithm is the Joint Bi-level Image experts Group (JBIG) compression method standard. The JBIG standard is within the ITU-T recommendation T.82. JBIG processes each pixel by determining if the pixel may be predicted by one or two selectable prediction schemes, and if not, coding the value arithmetically. Performing these tasks requires the value of the group neighboring pixels or context to be determined where the selection of the pixels for the context depends on the particular task.

As the pixels in an image line are processed according to the JBIG algorithm, the context for both the prediction schemes and the arithmetic coder need to be determined continuously. As context generation is necessary for the coding of a pixel, the speed of context generation affects the performance of the coder. Therefore, a need exists for an improved context generation in order to improve performance of JBIG compliant encoders and decoders.

BRIEF DESCRIPTION OF THE DRAWINGS

The present invention is illustrated by way of example and not limited by the accompanying figures, in which like references indicate similar elements, and in which:

FIG. 1 illustrates, in table form, a labeling of pixels in accordance with the prior art JBIG standard;

FIG. 2 illustrates, in table form, reference pixels for each spatial phase in accordance with the prior art JBIG standard;

FIG. 3 illustrates, in block diagram form, an image processor in accordance with one embodiment of the present invention;

Figure 4:
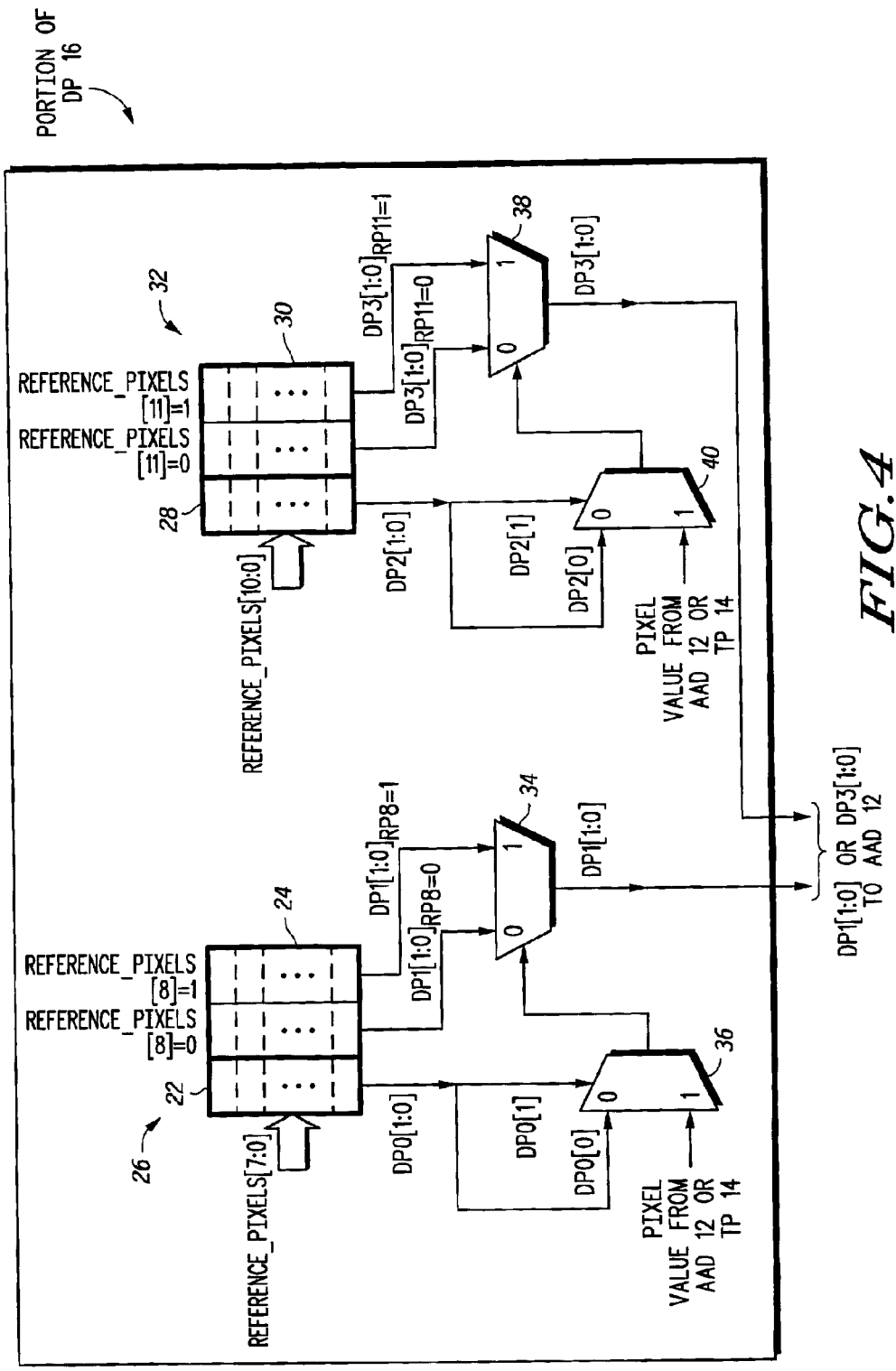
FIG. 4 illustrates, in block diagram form, a portion of a deterministic prediction unit of FIG. 3 in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or satatus. Furthermore, the conductors as discussed herein (or as shown in the figures) may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

JBIG defines a method for lossless compression encoding of a bi-level image. A bi-level image is an image having only two colors, such as, for example, a black and white image. However, JBIG applies for coding color images as well as greyscale. JBIG also has a "progressive" capability. Therefore, when decoding a progressively coded image, a low-resolution rendition of the original image is made available first with subsequent doublings of resolution as more data is decoded. Note that resolution reduction is performed from the higher to lower resolution layers, while decoding is performed from the lower to higher resolution layers. The lowest resolution image sent in a progressive sequence is a sequentially coded image. In a single-progression sequential coding application, this is the only image sent.

For example, let D denote the number of doublings in resolution (also referred to as differential layers) provided by the progressive coding. Let $I_D$ denote the highest resolution image and let its horizontal and vertical dimensions in pixels be $X_D$ and $Y_D$. Let $R_D$ denote the sampling resolution of the image $I_D$. JBIG imposes almost no restrictions on the parameters $R_D$, $X_D$, $Y_D$, or D. For example, choices such as 400 or 200 dpi (dots-per-inch) for the resolution $R_D$ of the highest resolution layer is appropriate for current facsimile standards. JBIG also does not restrict the number D of resolution doublings. For example, it can be set to 0 if progressive coding is not desired for the particular application.

Conceptually, a JBIG encoder therefore includes D algorithmically identical differential-layer encoders (which may be implemented as a single encoder which is used recursively). Since the encoding of each differential-layer is the same, only the description of the encoding at one layer will be described. Therefore, the incoming image will be referred to as the higher resolution image and the outgoing image as the lower resolution image. (Note that the higher and lower resolution images may therefore not be the highest and lowest resolution images of the entire system.)

A JBIG encoder may include many different units for compressing a received image such as, for example, a resolution reduction unit, a differential-layer typical prediction unit, a differential-layer deterministic prediction, model templates, adaptive templates, and an adaptive arithmetic encoder. For example, a JBIG encoder may include a resolution reduction unit which performs resolution reduction on the incoming image. The resolution reduction unit generally accepts a higher resolution image and creates a lower resolution image where the image may have half as many rows and half as many columns as the received higher resolution image. A differential-layer typical prediction (TP) encoder unit provides some coding gain and speeds implementation. A TP unit looks for regions within a layer of solid color and when it finds that a given current pixel for coding is in such a region, no further processing is necessary.

A differential-layer deterministic prediction (DP) encoder unit provides coding gain. When images are reduced in resolution by a particular resolution reduction algorithm, it sometimes happens that the value of a particular current higher-resolution pixel to be coded is inferable from the pixels already known to both the encoder and decoder. These include those pixels in the lower resolution image and those in the higher resolution image that are causally related (such as in a raster sense) to the current pixel. A raster sense refers to the fact that all pixels are accessed linearly and sequentially, and therefore, all those pixels previously accessed prior to the current pixel are known to both the encoder and decoder. If the DP encoder unit detects such a pixel that is deterministically predictable, it inhibits their coding by the arithmetic coder, which saves processing time and reduces the size of the compressed output. The DP unit may utilize a table driven algorithm. That is, the values of particular surrounding pixels in the lower resolution image and causal higher resolution image are used to index into a table to check for determinicity. If deterministic, a prediction can be obtained. The DP tables are dependent on the particular resolution reduction method used. Also, the DP tables may be stored in a memory such as a ROM (read only memory). The DP tables may be stored in separate memories, or may be stored in different portions of a same memory. Note that an example of a DP decoder unit, similar to the DP encoder unit, will be discussed below in reference to FIGS. 1–4.

A model templates unit provides the arithmetic coder with an integer called the context for each higher resolution image pixel to be coded. This integer is determined by the binary levels of particular pixels in the causal higher resolution image, by particular pixels in the already available lower resolution image, and by the spatial phase of the pixel being coded. The spatial phase describes the orientation of the higher resolution pixel with respect to its corresponding pixel in the lower resolution image. A JBIG encoder may also include an adaptive template unit which looks for periodicity in the image and on finding it changes the template so that the pixel preceding the current pixel by this periodicity is incorporated into the template.

The adaptive arithmetic encoder unit is an entropy coder. It notes the outputs of the TP and DP encoder units to determine if it is even necessary to code a given pixel. Assuming it is, it notes the context and uses its internal probability estimator to estimate the conditional probability that the current pixel will be a given color.

A JBIG encoder therefore outputs for each layer other than the lowest layer in the system (i.e. each higher resolution image) a lower resolution image and a compressed data representation of the higher resolution image. For the lowest resolution layer, a JBIG encoder outputs only the compressed data representation of the lowest resolution layer which may be used, without another image representation, to reconstruct the lowest resolution image.

Therefore, in a progressive system, the compressed data representation of each differential layer can then be provided to a JBIG decoder which can then reconstruct the original image. For example, the compressed data representation is used to reconstruct the lowest resolution image. The lowest resolution image is then used in combination with the compressed data representation corresponding to the next higher resolution image (i.e. the next layer) to reconstruct the next higher resolution image. This next higher resolution image therefore becomes the new lower resolution image which is used in combination with the compressed data representation corresponding to the next higher resolution image (the one following the new lower resolution image) to reconstruct the next higher resolution image. This process continues until the desired level of resolution is achieved, or until the highest resolution image of the system is achieved. A JBIG decoder, similar to the JBIG encoder described above, may also include an adaptive arithmetic decoder, a typical prediction (TP) decoder unit, and a deterministic prediction (DP) decoder unit.

FIG. 1 illustrates a labeling of pixels according to JBIG that are used to refer to the needed pixels from both the lower resolution and higher resolution images. (Pixels 0–3 are from the lower resolution image and pixels 4–12 are from the higher resolution image.) Pixels 0–3 refer to those pixels that are needed from the lower resolution image in order to make predictions for pixels 8, 9, 11, and 12 of the higher resolution image. Pixels 4, 5, 6, 7, and 10 refer to those pixels that are needed from the higher resolution image in order to make predictions for pixels 8, 9, 11, and 12.

FIG. 2 illustrates in table form the neighboring, or "reference," pixels which are used to make predictions for each particular spatial phase, where each spatial phase includes a target pixel (e.g. spatial phase 0 corresponds to target pixel 8, spatial phase 1 to target pixel 9, spatial phase 2 to target pixel 11, and spatial phase 3 to target pixel 12). The target pixel refers to the pixel currently being decoded. For each of the four possible spatial phases, a different set of reference pixels is used for obtaining predictions. The reference pixels used for each of the four possible spatial phase are labeled in FIG. 2 and are known to both the JBIG encoder and decoder at the time the particular spatial phase is to be coded. For example, to encode or decode phase 0 (target pixel 8), reference pixels 0–7 are needed. Likewise, to encode or decode phase 1 (target pixel 9) reference pixels 0–8 are needed, etc.

The DP decoder unit therefore includes four DP look-up tables, one corresponding to each spatial phase 0–3. The value of the reference pixels for each phase is used to address the prediction value from the appropriate DP table. For example, for phase 3, an 11 bit value (reference pixels 0–11) is used to reference the prediction value. Therefore, the look-up table corresponding to phase 3 includes $2^{11}$ entries (4095) where the values of reference pixels 0–11 are used to address one of the entries. If reference pixels 11–0 had values of 00000000101, respectively, then the 5th entry of the look-up table for phase 3 provides the prediction value (since %00000000101=5). The prediction value returned (referred to as DP3[1:0] for phase 3) is a 0, 1, or 2. A "0" indicates that there is a "hit" and that the target pixel is background (0). A "1" indicates a "hit" and that the target pixel is foreground (1). For example, in a black and white image, a 0 may refer to white and a 1 black, or vice versa. Therefore, a "hit" indicates that a deterministic prediction is possible. A "2" indicates that it is not possible to make a deterministic prediction. Note also that the values of 0, 1, and 2 can all be represented by a 2-bit value (%00, %01, and %10, respectively).

In one implementation of the DP decoder unit, a DP look-up table is accessed with each spatial phase, since the previous result is needed for the subsequent target pixel. For example, to obtain the prediction value from the DP table corresponding to phase 1 for target pixel 9, reference pixels 0–8 are needed. Therefore, the value of target pixel 8 must first be known. Therefore, in one implementation, a first access is made to the DP look-up table to obtain the prediction value for phase 0 in order to obtain a value for target pixel 8. Once processing of target pixel 8 is complete, then its value is used to obtain target pixel 9. However, due to the sequential nature of this implementation, one access to a corresponding DP look-up table is needed for each spatial phase because the next phase cannot be processed until the previous one has completed. If the DP look-up tables are stored in a memory, then one clock cycle is required for each spatial phase, thus increasing processing time.

FIG. 3 illustrates an image processor 10 which implements a decoder in accordance with one embodiment of the present invention. Image processor 10 includes an adaptive arithmetic decoder (AAD) 12, a TP unit 14, a DP unit 16, and a higher resolution image buffer 18. Image processor 10 receives previous lower resolution image data (corresponding to a lower resolution image previously constructed) via conductors labeled reference_pixels[3:0]. This corresponds to FIG. 2 which labels the pixels from the lower resolution image as reference pixels 0–3. AAD 12 receives the current compressed image data corresponding to the current layer (the current higher resolution image data that is being computed) and outputs the current higher resolution image data to higher resolution image buffer 18. Image processor 10 therefore uses the previous lower resolution image from a previous iteration (previous layer), and the current compressed image data corresponding to the current higher resolution image data to reconstruct the current higher resolution image data corresponding to the previous lower resolution image.

TP decode unit 14 and DP decoder unit 16 each receive the last decoded pixel out from AAD 12 and the current higher resolution image data output. TP decode unit 14 attempts to predict the current pixel, and provides TPVALUE[1:0] to AAD 12 and DP decode unit 16. DP decode unit 16 outputs DP1[1:0] or DP3[1:0] to AAD 12 and receives reference_pixels[11:4] from higher resolution image buffer 18. Since the current higher resolution image data output is provided sequentially bit by bit, higher resolution image buffer 18 stores the accumulated bits in order for DP decode unit 16 to obtain the necessary reference pixels, as will be discussed further with reference to FIG. 4. As with the encoder, AAD 12 decodes the current pixel only if TP decode unit 14 and DP decode unit 16 cannot predict it. TP decode unit 14 works analogously to the TP encoder unit described above. Therefore, if TP decode unit 14 and DP decode unit 16 are unable to predict the target pixel, AAD 12 calculates the target pixel and outputs it to DP decode unit 16 as PIXEL OUT.

FIG. 4 illustrate a portion of DP decode unit 16 of FIG. 3 in accordance with one embodiment of the present invention. DP decode unit 16 includes a phase 0/1 table 26 which includes phase 0 table 22 and phase 1 table 24. DP decode unit 16 also includes a multiplexer (MUX) 34 and a multiplexer (MUX) 36 coupled to phase 0/1 table 26. MUX 34 receives DP1[1:0]$_{rp8=0}$ (the two-bit prediction value in the phase 1 table assuming the most significant bit, reference_pixels[8], is 0), DP1[1:0]$_{rp8=1}$ (the two-bit prediction value in the phase 1 table assuming the most significant bit, reference_pixels[8], is 1), and the output of MUX 36 (which is the value of reference_pixels[8]). MUX 36 receives DP0[0] (the least significant bit of the two-bit prediction value from the phase 0 table), DP0[1] (the most significant bit of the two-bit prediction value from the phase 0 table), and a pixel value from either AAD 12 (via PIXEL OUT) or TP decode unit 14 (via TP VALUE[1:0]). DP decode unit 16 also includes a phase 2/3 table 32 which includes phase 2 table 28 and phase 3 table 30. DP decode unit 16 also includes a multiplexer (MUX) 38 and a multiplexer (MUX) 40 coupled to phase 2/3 table 32. MUX 38 receives DP3[1:0]$_{rp11=0}$ (referring to the two-bit prediction value in the phase 3 table assuming the most significant bit, reference_pixels[11], is 0), DP3[1:0]$_{rp11=1}$ (the two-bit prediction value in the phase 3 table assuming the most significant bit, reference_pixels[11], is 1), and the output of MUX 40 (which is the value of reference_pixels[11]). MUX 40 receives DP2[0] (the least significant bit of the two-bit prediction value from the phase 0 table), DP2[1] (the most significant bit of the two-bit prediction value from the phase 0 table), and a pixel value from either AAD 12 (via PIXEL OUT) or TP decode unit 14 (via TP VALUE[1:0]). Therefore, depending on which spatial phase is being decoded, DP decode unit 16 outputs either DP1[1:0] or DP3[1:0], as illustrated in FIG. 3.

In operation, the embodiment of FIG. 4 allows for a more efficient DP decoding. Phase 0 table 22 corresponds to the DP look-up table for phase 0 (having $2^8$ entries) and phase 1 table 24 corresponds to the DP look-up table for phase 1 (having $2^9$ entries), as was described above. The addressing of phase 1 table 24 is similar to the addressing of phase 0 table 22 in that the reference pixels 0–7 (corresponding to the address reference_pixels[7:0]) for each table are the same except that phase 1 table 24 further requires the use of reference_pixels[8], its most significant bit. Therefore, the size of phase 1 table 24 is simply twice the size of phase 0 table 22, and phase 1 table 24 may be represented, as in FIG. 4, as a table having two portions, one corresponding to reference_pixels[8] being 0 and the other corresponding to reference_pixels[8] being 1. Thus, for a given reference_pixels[7:0], three 2-bit values may be output where the first one (DP0[1:0]) corresponds to phase 0, and the second and third ones (DP1[1:0]$_{rp8=0}$ and DP1[1:0]$_{rp8=1}$, respectively) correspond to phase 1. Two values are output for phase 1 because two prediction values correspond to each reference_pixels[7:0]. One of the two values corresponds to the value if reference_pixels[8] is a zero and the other corresponds to the value if reference_pixels[8] is a one. Using this information, the prediction values for two spatial phases (two target pixels) may be read from the DP look-up tables simultaneously.

For example, if target pixel 8 is being decoded, the reference pixels 7–0 are used to read a prediction value from phase 0 table 22 and two prediction values from the phase 1 table 24. If tables 22 and 24 are stored in memory, then only a single clock cycle is required to obtain these three values. MUX 36 receives DP0[1:0] from phase 0 table 22.

Since a prediction value of 2 (%10) indicates that the current pixel cannot be deterministically predicted, the most significant bit, DP0[1] is used to control MUX 36. If DP0[1] is a 1, indicating that the prediction value was 2 (%10), then a pixel value is taken either from TP decode unit 14 via TP VALUE[1:0] (assuming TP decode unit 14 was able to predict it) or from ADD 12 via PIXEL OUT (assuming TP 14 and DP 16 were unable to predict it). If DP0[1] is a 0, indicating that DP0[1:0] is a 0 (%00) or 1 (%01), then the current pixel can be deterministically predicted and DP0[0] is output as the current target pixel value (either a 0 or 1, depending on DP0[0]). Once a value for the current target pixel (in this example, target pixel 8) is output via MUX 36, then MUX 34 outputs the target pixel value for the next target pixel (e.g. target pixel 9). Therefore, note that the output of MUX 36 is reference_pixels[8] which is used as the control for MUX 34, such that the appropriate prediction value is output via DP1[1:0]. For example, if reference_pixels[8] at the output of MUX 36 was determined to be a 0, then $DP1[1:0]_{rp8=0}$ is output via MUX 34. However, if reference_pixels[8] was determined to be a 1, then $DP1[1:0]_{rp8=1}$ is output via MUX 34.

Both values of DP1[1:0] are fetched simultaneously with the value of DP0[1:0]. Therefore, the only delay between determining target pixel 8 and target pixel 9 is the timing delay of the combination logic used to determine pixel 8. This timing delay may refer to the delay through combinational logic when the prediction from phase 1 table 22 is indeterminate (a "2") and the value of reference_pixels[8] output via MUX 36 must be input from AAD 12 or TP decode unit 14. That is, the output DP1[1:0] must wait until the input to MUX 36 from AAD 12 or TP decode unit 14 is received. However, if the output of phase 1 table 22 is determinate, the delay for outputting DP1[1:0] may be considered negligible (since MUXes 36 and 34 provide only minimal delay). After determining target pixel 8, a separate access to phase 1 table 24 for target pixel 9 is not required since it was already previously accessed. Therefore, two spatial phases may be determined with simultaneous accesses to the DP look-up tables (represented as phase 0 table 22 and phase 1 table 24).

The same analysis as described above with reference to phase 0/1 table 26 described above applies to spatial phases 2 and 3, where an access for spatial phase 2 access a two-bit prediction value for target pixel 11 as well as two two-bit prediction values for target pixel 12 (one corresponding to reference_pixels[11] being 0 and the other to reference_pixels[11] being 1). Therefore, each access to phase 2/3 table 32 produces 3 two-bit values: DP2[1:0] from phase 2 table 28, $DP3[1:0]_{rp11=0}$ from phase 3 table 30, and $DP3[1:0]_{rp1=1}$ from phase 3 table 30. Operation of MUXes 38 and 40 are analogous to operation of MUXes 34 and 36, respectively, as was described above. Therefore, depending on which phase includes the current target pixel, either DP1[1:0] or DP3[1:0] is output from DP decode unit 16. Note that when target pixel 8 is decoded, target pixel 9 is also received, and when target pixel 11 is decoded, target pixel 12 is also received; therefore, two target pixels (i.e. two spatial phases) can be decoded with simultaneous accesses to the DP lookup tables (and within a same clock period, as will be seen in reference to FIG. 5).

Note that while phase 0 table 22 and phase 1 table 24 are drawn side by side as a single phase 0/1 table 26, they may still be maintained as separate tables within separate memories or within separate portions within a same memory. The same applies to phase 2 table 28 (having $2^{10}$ entries) and phase 3 table 30 (having $2^{11}$ entries, which is $2 \times 2^{10}$ entries).

Therefore, DP decode 16 complies with the JBIG standard using the DP look-up tables for phases 0–3 defined by JBIG but allows for a more efficient decode implementation by accessing two DP tables (for two different phases) simultaneously.

Figure 5:
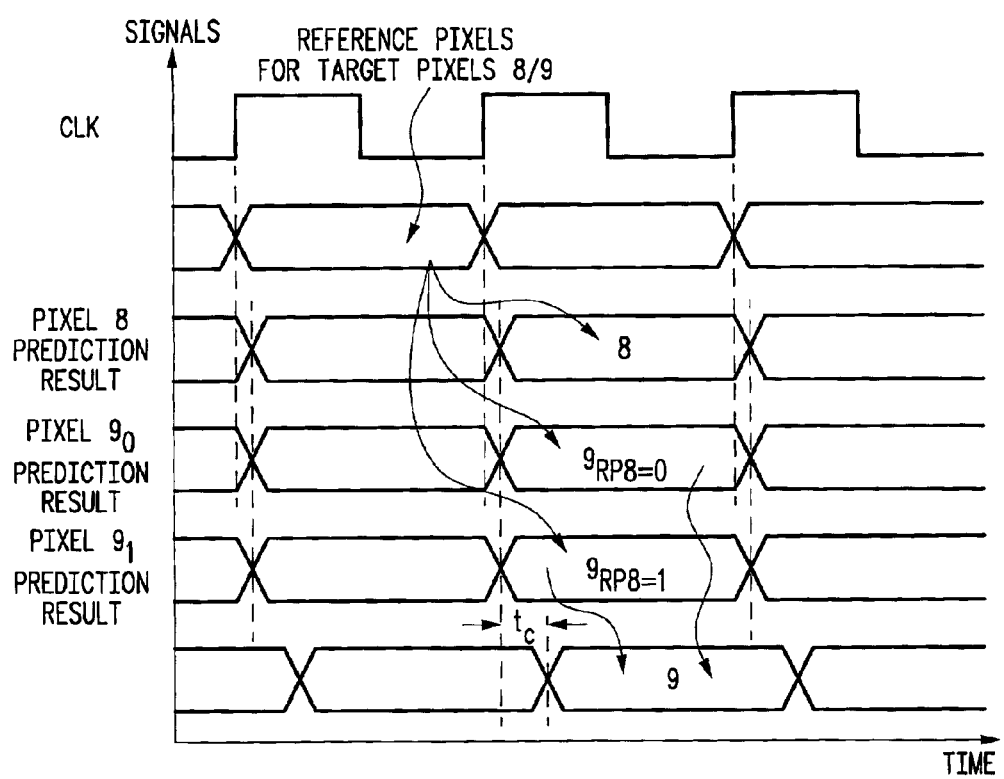
FIG. 5 illustrates, in timing diagram form, a deterministic prediction operation in accordance with another embodiment of the present invention.

FIG. 5 illustrates a timing diagram illustrating operation of DP decode unit 16. During the first clock cycle, reference pixels for target pixels 8 and 9 are used to retrieve 3 two-bit prediction values in the next clock: a prediction value for target pixel 8, a prediction value for target pixel 9 assuming reference_pixels[8] is 0, and a prediction value for target pixel 9 assuming reference_pixels[8] is 1. In this same clock cycle, both target pixels 8 and 9 (corresponding to spatial phases 0 and 1, respectively) are determined. First target pixel 8 is determined, along with two values for target pixel 9. Then, a time $t_c$ later, target pixel 9 is determined using the results of target pixel 8 (as was described previously) where $t_c$ is the timing delay of the combinational logic (such as the timing delay in getting the output of MUX 36 from AAD 12 or TP decode unit 14). Therefore, one can appreciate how the implementation of DP decode 16 can reduce decode time by decoding two spatial phases within a same clock cycle.

Although the invention has been described with respect to specific conductivity types or polarity of potentials, skilled artisans appreciate that conductivity types and polarities of potentials may be reversed. For example, either active high or active low signals may be implemented for the various signals discussed above.

In the foregoing specification, the invention has been described with reference to specific embodiments. However, one of ordinary skill in the art appreciates that various modifications and changes can be made without departing from the scope of the present invention as set forth in the claims below. For example, the circuitry described herein can be embodied in a single integrated circuit, or more than one integrated circuits, or in a combination of hardware and software. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An image processing system, comprising:
    a deterministic prediction decode unit for predicting individual pixels of an image based on a predetermined deterministic prediction algorithm, the deterministic prediction decode unit comprising:
        a look-up table for storing values to be used by the predetermined deterministic prediction algorithm when converting a relatively low resolution image to a relatively higher resolution image;
    wherein the look-up table is organized into four spatial phases, and wherein a prediction is made for a target pixel by accessing at least two of the four spatial phases of the look-up table to read at least two possible values of the target pixel.

2. The image processing system of claim 1, wherein the look-up table is implemented in a memory device, and a plurality of reference pixels are provided for addressing the memory device to retrieve the values to be used by the predetermined deterministic prediction algorithm, wherein a reference pixel is a pixel that is used to predict a value of the target pixel.

3. The image processing system of claim 2, wherein the memory device comprises first, second, third, and fourth memory portions corresponding to first, second, third, and fourth spatial phases, respectively, and the second memory portion is divided into first and second sub-portions, wherein values are stored in the first and second sub-portions based on a predetermined bit of the reference pixels used to access the first and second sub-portions.

4. The image processing system of claim 3, further comprising:
a first multiplexer having a first input coupled to an output of the first sub-portion for receiving second phase prediction values, a second input coupled to an output of the second sub-portion for receiving the second phase prediction values, and an output for providing a second phase prediction result; and
a second multiplexer having a first input coupled to an output of the first memory portion for receiving a first phase prediction value, a second input for receiving a first phase pixel value from another source, and an output coupled to a control input of the first multiplexer, the output of the second multiplexer for providing a first phase decoded pixel value.

5. The image processing system of claim 4, wherein the fourth memory is divided into third and fourth sub-portions, wherein values are stored in the third and fourth sub-portions based on a predetermined bit of the reference pixels used to access the third and fourth sub-portions.

6. The image processing system of claim 5, further comprising:
a third multiplexer having a first input coupled to an output of the third sub-portion for receiving fourth prediction values, a second input coupled to an output of the fourth sub-portion for receiving the fourth phase prediction values, and an output for providing a fourth phase prediction result; and
a fourth multiplexer having a first input coupled to an output of the third memory portion for receiving a third phase prediction value, a second input for receiving a third phase pixel value from another source, and an output coupled to a control input of the third multiplexer, the output of the fourth multiplexer for providing a third phase decoded pixel value.

7. The image processing system of claim 6, wherein if the first phase prediction value is determined to be predictable using deterministic prediction, the second phase prediction result is provided within a same clock period.

8. The image processing system of claim 7, wherein if the first phase prediction value is determined to be not predictable using deterministic prediction, the second phase prediction result is provided within a same clock period that the first phase pixel value is available to the second multiplexer.

9. The image processing system of claim 8, wherein if the third phase prediction value is determined to be predictable using deterministic prediction, the fourth phase prediction result is provided within a same clock period.

10. The image processing system of claim 9, wherein if the third phase prediction value is determined to be not predictable using deterministic prediction, the fourth phase prediction result is provided within a same clock period that the third phase pixel value is available to the third multiplexer.

11. A method for deterministic prediction of a target pixel in an image processing system, comprising the steps of:
providing reference pixels corresponding to the target pixel to address terminals of first and second memories;
storing prediction values in the first and second memories based on a predetermined bit of the reference pixels; and
retrieving the prediction values from the first and second memories in response to the reference pixels for providing two prediction values corresponding to the target pixel;
determining that the first and second memories store second phase prediction values;
storing first phase prediction values in a third memory;
retrieving the first phase prediction value for a first phase target pixel;
if the first phase prediction value is predictable, the first phase prediction value determines a first phase decoded pixel value, and the first phase decoded pixel value is used to select one of the two second phase prediction values as a second phase prediction result.

12. The method of claim 11, wherein the predetermined bit is characterized as being a most significant bit of the reference pixels used to access the first and second memories.

13. The method of claim 11, further comprising the step of:
if the first phase prediction value is not predictable, the first phase decoded pixel value is determined by another source, and the first phase decoded pixel value is used to select one of the two second phase prediction values as a second phase prediction result.

14. The method of claim 11, wherein if the first phase prediction value is determined to be predictable, the second phase prediction result is provided within a same clock period as the first phase prediction value is determined.

15. An image processing system, comprising:
an adaptive arithmetic decoder for receiving compressed image data, and in response, providing high resolution data;
a higher resolution image buffer for receiving the high resolution data, and in response, providing a first plurality of reference pixels;
a deterministic prediction decode unit, for receiving the first plurality of reference pixels and a second plurality of reference pixels, the deterministic prediction decode unit comprising:
a look-up table for storing values to be used by a deterministic prediction algorithm when converting a relatively low resolution image to a relatively higher resolution image;
wherein the look-up table is organized into four spatial phases, and wherein a prediction is made for a target pixel by accessing at least two of the four spatial phases of the look-up table to read at least two possible values of the target pixel.

16. The image processing system of claim 15, wherein the look-up table is implemented in a memory device, and the first and second pluralities of reference pixels are provided for addressing the memory device to retrieve the values to be used by the deterministic prediction algorithm, wherein a reference pixel is a pixel that is used to predict a value of the target pixel.

17. The image processing system of claim 16, wherein the memory device comprises first, second, third, and fourth memory portions corresponding to first, second, third, and fourth spatial phases, respectively, and the second memory portion is divided into first and second sub-portions, wherein values are stored in the first and second sub-portions based on a predetermined bit of the reference pixels used to access the first and second sub-portions.

18. The image processing system of claim 17, further comprising:

a first multiplexer having a first input coupled to an output of the first sub-portion for receiving second phase prediction values, a second input coupled to an output of the second sub-portion for receiving the second phase prediction values, and an output for providing a second phase prediction result; and a second multiplexer having a first input coupled to an output of the first memory portion for receiving a first phase prediction value, a second input for receiving a first phase pixel value from another source, and an output coupled to a control input of the first multiplexer, the output of the second multiplexer for providing a first phase decoded pixel value.

19. The image processing system of claim 18, wherein if the first phase prediction value is determined to be predictable using deterministic prediction, the second phase prediction result is provided within a same clock period.

* * * * *

UNITED STATES PATENT AND TRADEMARK OFFICE
CERTIFICATE OF CORRECTION

PATENT NO. : 6,999,627 B2  
APPLICATION NO. : 10/025290  
DATED : December 19, 2001  
INVENTOR(S) : Colin MacDonald et al.

It is certified that error appears in the above-identified patent and that said Letters Patent is hereby corrected as shown below:

Column 10, Line 11, Claim No. 11:

Delete "and".

Signed and Sealed this

Twenty-sixth Day of June, 2007

JON W. DUDAS  
*Director of the United States Patent and Trademark Office*

UNITED STATES PATENT AND TRADEMARK OFFICE
CERTIFICATE OF CORRECTION

| | |
|---|---|
| PATENT NO. | : 6,999,627 B2 |
| APPLICATION NO. | : 10/025290 |
| DATED | : February 14, 2006 |
| INVENTOR(S) | : Colin MacDonald et al. |

Page 1 of 1

It is certified that error appears in the above-identified patent and that said Letters Patent is hereby corrected as shown below:

Column 10, Line 11, Claim No. 11:

Delete "and".

This certificate supersedes Certificate of Correction issued June 26, 2007.

Signed and Sealed this

Twenty-fourth Day of July, 2007

JON W. DUDAS
*Director of the United States Patent and Trademark Office*